United States Patent [19]
Sorensen

[11] 3,779,005
[45] Dec. 18, 1973

[54] TURBOCHARGED PISTON ENGINE HAVING IMPROVED ECONOMIZER AND SELF IGNITION

[76] Inventor: George C. Sorensen, 589 S.E. 4th St., Ontario, Oreg. 97914

[22] Filed: May 10, 1971

[21] Appl. No.: 141,868

Related U.S. Application Data
[63] Continuation-in-part of Ser. No. 800,200, Feb. 18, 1969, abandoned.

[52] U.S. Cl. ............................. 60/11, 60/14, 60/15
[51] Int. Cl. ............................................. F02b 9/00
[58] Field of Search ............... 123/25.2, 25.1, 25 P; 60/11, 14, 15, 17, 39.54

[56] References Cited
UNITED STATES PATENTS

| | | | |
|---|---|---|---|
| 1,433,185 | 10/1922 | Da Costa | 60/15 |
| 1,773,995 | 8/1930 | Goldsborough | 60/15 |
| 1,848,380 | 3/1932 | Parks | 123/25.2 |
| 2,113,601 | 4/1938 | Pratt | 60/15 |
| 2,352,267 | 6/1944 | Kelsey | 123/25.2 |

Primary Examiner—Martin P. Schwadron
Assistant Examiner—Allen M. Ostrager

[57] ABSTRACT

A conventional turbocharged internal combustion engine of either 2 stroke cycle or 4 stroke cycle having auxiliary mechanism adapted to capture hot products of combustion or exhaust gas and by compression elevated heat provides ignition, superheated steam expansion energy and includes an exhaust turbine for utilization of powerful blowdown energy and by great reduction of final exhaust temperature facilitates condensation of combustion compounded water for recirculation through an included water reclamation and combustion cooling system.

1 Claim, 7 Drawing Figures

INVENTOR.
GEORGE C SORENSEN

INVENTOR
GEORGE C SORENSEN

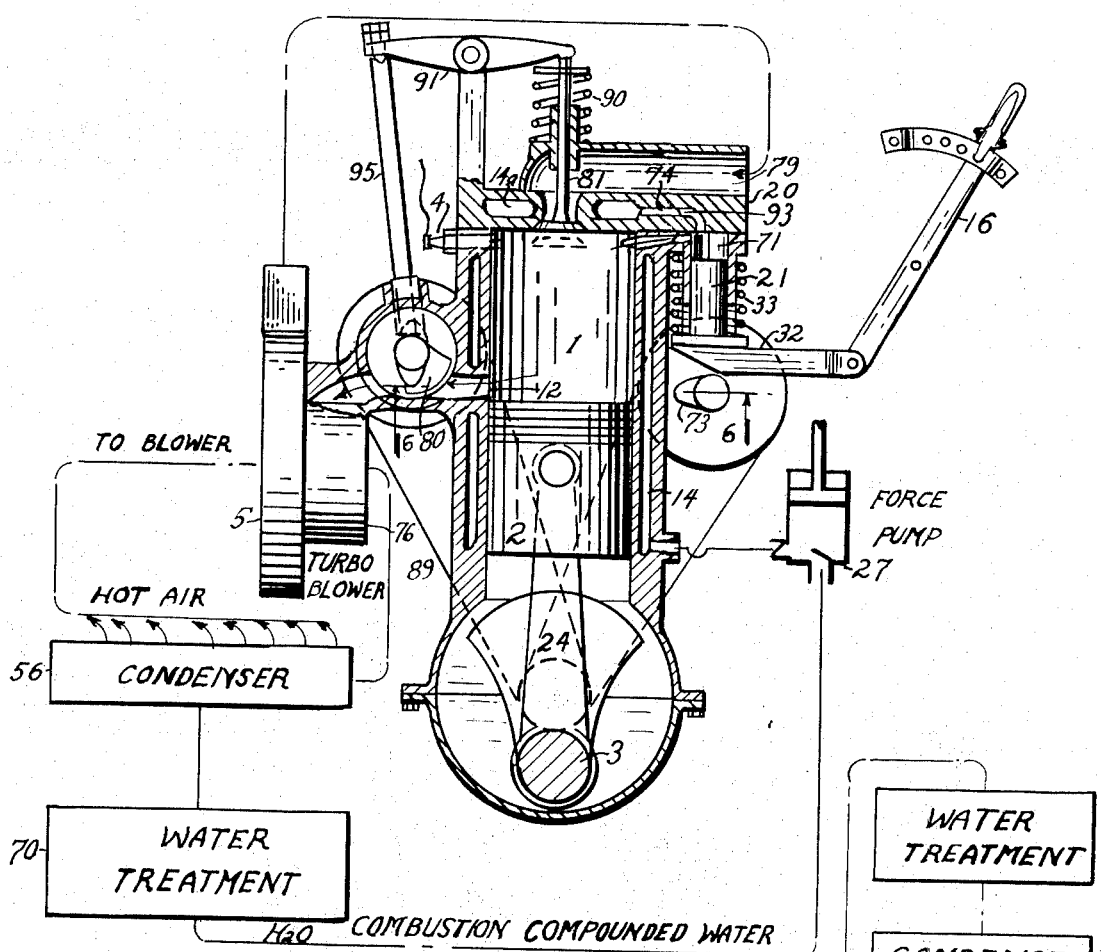
FIG. 5.
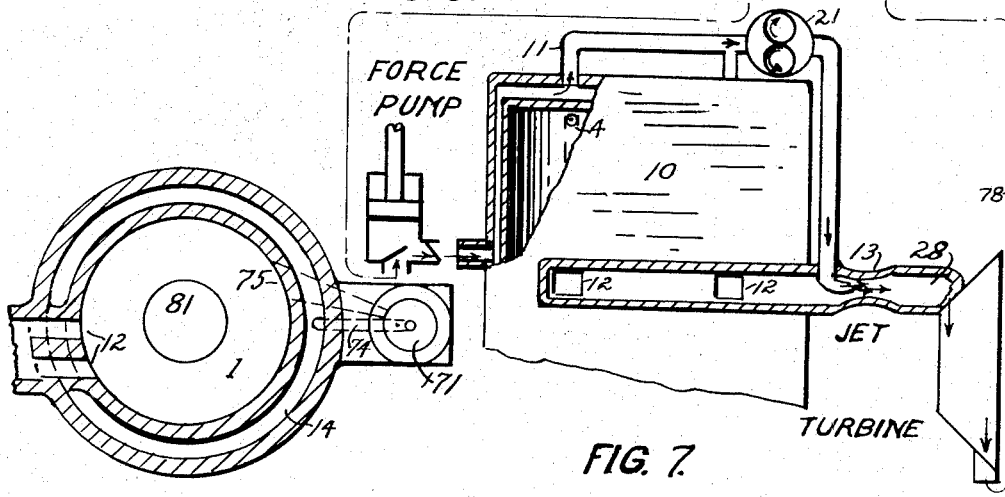
FIG. 6.
FIG. 7.
INVENTOR
GEORGE C SORENSEN

TURBOCHARGED PISTON ENGINE HAVING IMPROVED ECONOMIZER AND SELF IGNITION

The present application is a continuation-in-part of Ser. No. 800,200, filed Feb. 18, 1969, now abandonned.

Other related patents include U.S. Pat. Nos. 3572037, 3688496, and patent application Ser. No. 68395, now pending.

The present invention represents a great advance in the automotive internal combustion engine since it utilizes heat discorded through two of the major sources of efficiency loss. The greatest efficiency of the conventional internal combustion engine runs about 34 percent they suffer their greatest heat losses, about 30 percent through the exhaust system, and another 30 percent through the cooling system. Varying temperatures of engine parts, varying pressures of combustion process and faulty combustible mixtures, are some of the causes contributing to poor efficiency; exhaust emmissions of partialy consumed fuel and other particles further contribute to the already dangerously polluted atmosphere. The electrical spark ignition system of the conventional internal combustion engine causes many engine failures and also causes electronic interference with radio reception. A serious fault is that such radio activity quickly reveals their position to an enemy during military action. High pressure injection pumps, leaks, and the like, cause serious trouble in the Diesel engines.

Accordingly it is an object of the present invention to provide an engine using the low compression heat intensified exhaust gas for ignition of the fresh charge of combustible mixture partially forced into the greater compression zone of auxiliary cylinder, when by propagation of flame combustion process in a controlled manner, the heat intensified exhaust gas travels through the restricting passage into the main combustion charge where its function continues.

It is another object of the present invention to provide an engine capable of capturing unburned fuel particles, rearrange them in relation to unused oxygen molecules, and ignite them by the compression elevated exhaust heat.

It is another object of the present invention to provide an engine having clean exhaust emmissions.

It is yet another object of the present invention to provide an engine, which after ignition, forces hot water from combustion cylinders cooling jacket flashed as steam through diverging nozzles into shielded compression bays of auxiliary cylinders compression zones thereby for absorbing compression intensified heat of the exhaust gas, thereby providing great expansion pressure for opposing further invasion of the combustion process into the auxiliary cylinders.

Still a further object of this invention is the provision of great steam and exhaust gas expansion for blowdown through an exhaust turbine.

Still a further object of this invention is the provision of great steam and exhaust gas expansion for the vigorous blowdown energy and collapse of pressure in the auxiliary cylinder communicating its elastic mass inertial movement to draught the entering combustion exhaust gas for capture, boosted by the blower driven air or combustible mixture.

Yet another object of this invention is to provide an engine having low compression exhaust gas ignition without the necessity of having the massive weight and strength of the Diesel engine construction. Still another object of this invention is the provision of the great expansive steam cooling of products of combustion gas while still in captivity under pressure facilitating the condensation of its compounded water for circulation through the cooling and steam systems of the engine as makeup water.

With the foregoing and other objects in mind I have developed an engine fullfilling these objects by the new and novel arrangement, combination, ane construction of parts as hereinafter more fully described and set forth in the claims appended hereto and disclosed in the accompanying drawings forming part hereof. It will be well to state at this point the engine may vary in form, number and arrangement of parts without departing from the spirit of the invention.

In the accompanying drawings forming a part hereof:

FIG. 5 is a sectional view of a single cylinder with auxiliary parts.

FIG. 6 is a cross section view taken on plane 6—6.

FIG. 7 is a sectional view of a modified structure.

Figure 1:
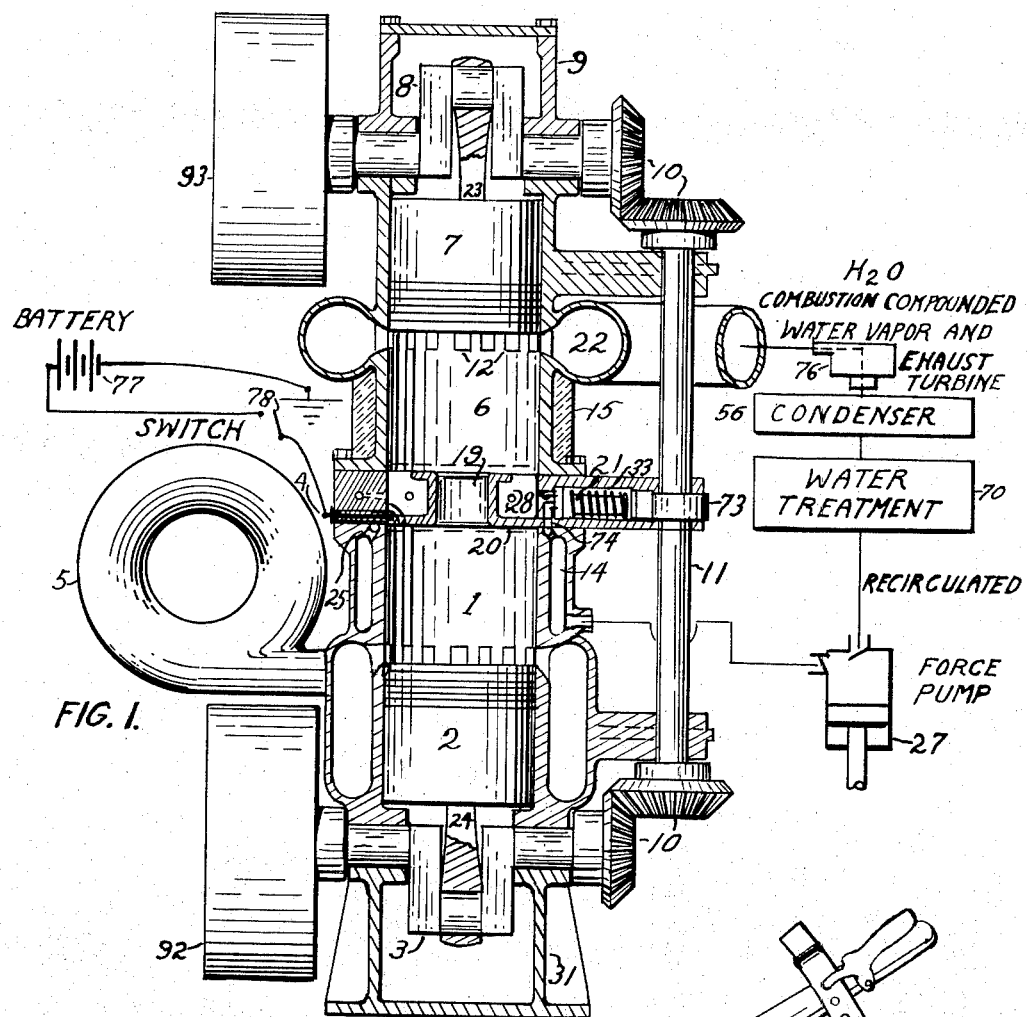
FIG. 1 is a sectional view showing the internal arrangement of a two stroke cycle uniflo internal combustion engine and auxiliary parts comprising the improvement.
Figure 2:
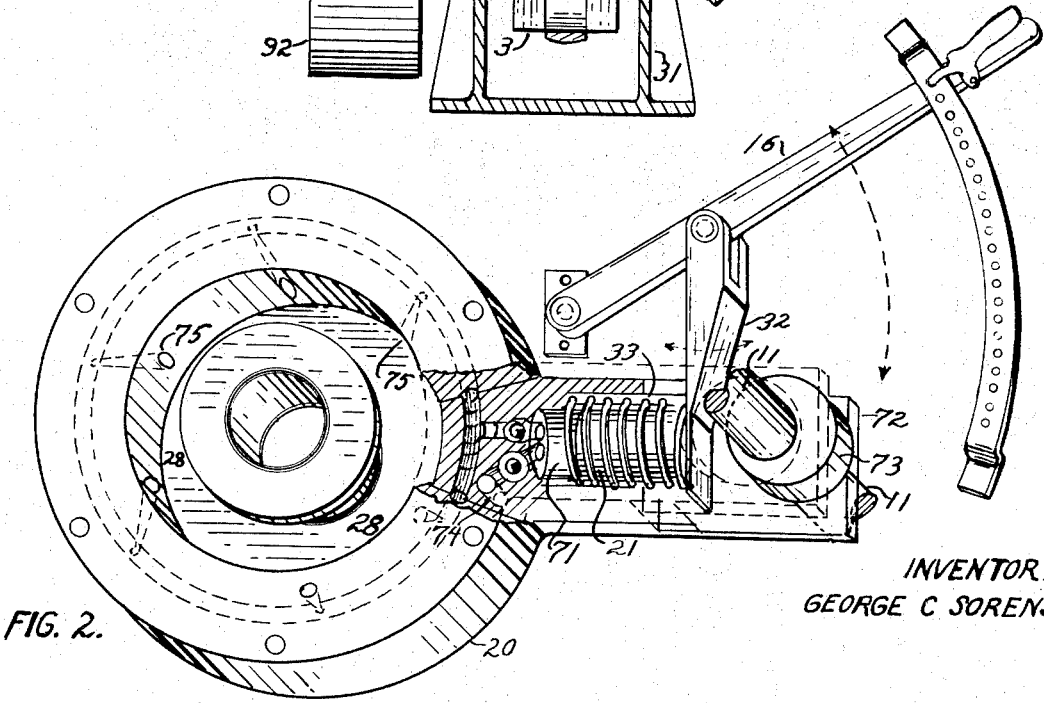
FIG. 2 is an enlarged view showing the central separator and its parts.

In describing the several embodiments of the invention illustrated in the drawings, like reference figures will be used for similar elements for the sake of clarity; However, it is not intended to be limited to the specific terms so selected, and it is to be understood that each specific term includes all technical equivalents which operate in a similar manner to accomplish a similar purpose.

Referring now to one embodiment of the invention, FIG. 1 represents a turbocharged two stroke cycle internal combustion engine having auxiliary mechanism capable of receiving, capturing and compressing hot exhaust gas from the combustion chamber, for utilizing heat commonly rejected through the exhaust system. The auxiliary mechanism provides ignition, absorption of heat by steam expansion, pressure derived oposing further intrusion of combustion process, a powerful blowdown blast for energizing the exhaust turbine and by expansion greatly cooling the exhaust gas thereby facilitating the condensation of the combustion compounded $H_2O$ water vapor. The said exhaust gas comprises principally carbon dioxide, nitrogen and compounded water vapor. The carbon dioxide and nitrogen may be exhausted to the atmosphere filtered of its solid particles. In FIG. 1:

A reciprocatively mounted piston in cylinder 1 is pivotally secured to connecting rod 24 rotatively engaging crankshaft 3 rotatively mounted in crankcase 31; a spacer 20 secured between cylinder 1 and auxiliary cylinder 6 provides communication from cylinder 1 with cylinder 6 through elongated flanged passage 19 providing bay 28; auxiliary piston 7 pivotally secured to connecting rod 23 rotatively engaging crankshaft 8 rotatively mounted in crankcase 9 provides reciprocating action to piston 7; crankshaft 3 and crankshaft 8 are miter geared 10 to shaft 11 with a 12 degree lead on crankshaft 8 providing early opening and closing of exhaust ports 12 in relation to admission ports 13; a pump comprising cylinder 71 machined in bearing support 72 and a plunger 21 is actuated by cam 73 and adjustable wedge 32 to receive pressurized hot water from channel 25 formed in cylinder block communicating with cooling water jacket 14 forced through passage 74 flashed to steam through divergent nozzles 75 tangentially into bay 28; blower 5 forces combustible mixture through ports 13 into cylinder 2; passages carry final exhaust through turbine 76 condenser 56 water treatment filter 70 force pump 27; a bypass relief valve 62 is inserted in excess flow cooling water system and return passage to force pump 27; insulation 15 may be formed around auxiliary cylinder; start up electric ignition is indicated by battery 77 switch 78 and glow plug 79.

Figure 3:
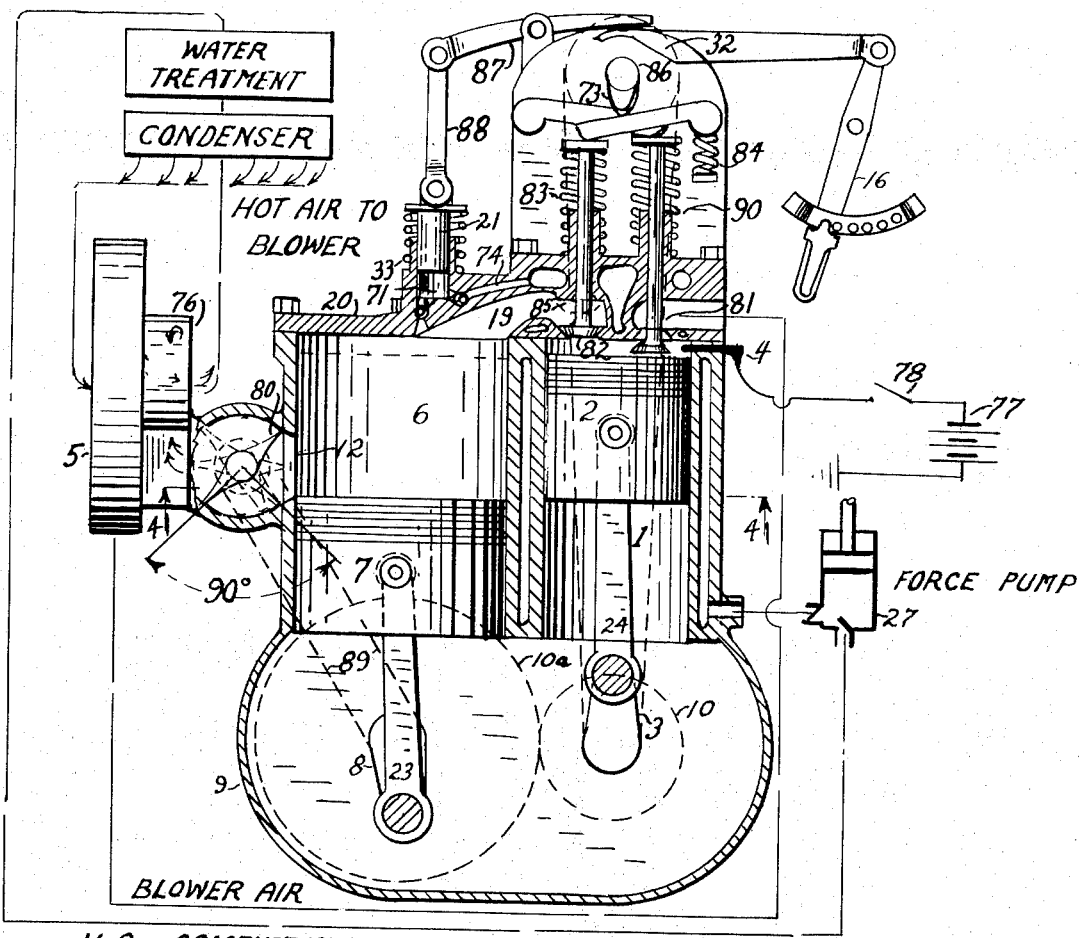
FIG. 3 is a sectional view showing a four stroke cycle engine and its relation to its auxiliary improvement parts.
Figure 4:
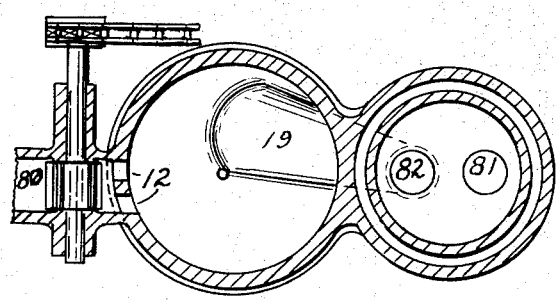
FIG. 4 is a cross section taken on plane 4—4 of FIG. 3.

Referring to another embodiment FIG. 3 represents a turbocharged four stroke cycle internal combustion engine and auxiliary mechanism showing the relation of all elements in relation to each other and by using similar refferrence numbers as the embodiment in FIG. 1 here again number 1 indicates a combustion cylinder; combustion piston 2 disposed to reciprocate pivotally secured to connecting rod 24 which rotatively engages crankshaft 3 having secured gear 10 engagement with one half speed secured gear 10a with crankshaft 8 rotatively engaging connecting rod 23 pivotally secured to reciprocative piston 7 in cylinder 6; a conventional admission valve 81 is provided for cylinder 1; and a stopper valve 82 to close passage 19 only during admission stroke and drawn by spring 83 sealably against its valve guide 85 providing conduction cooling and seal oposing pressure leakage along valve stem 81 during compression and combustion stroke; a yielding resilience 84 provides safety against over pressure on valve during its closure; a timed pressure pump cylinder 71 is formed in cylinder head 20 having communication passage 74 with water jacket 14 plunger 21 is reciprocative in said cylinder actuated by cam 73 on half speed camshaft 86 engaging wedge 32 through lever 87 and link 88; pump plunger 21 may be variably controlled by lever 16 and wedge 32; a rotary retention valve 80 timed with chain 89 loosely closes exhaust ports 12 during first 90 degrees of piston 7 compression stroke for capturing exhaust gas but is open during auxiliary cylinders exhaust blowdown; An exhaust turbine 76 and blower 5 are provided for charging combustion cylinder 1; a condenser 56 water treatment filter 70 provide H₂O water reclamation and water conduit to force pump 27 and water jacket 14 also a hot air conduit from condenser to blower intake are provided. A start up electric ignition system comprising battery 77 switch 78 and glow plug 79 must be used.

Referring to FIG. 5 is another embodiment of the present invention requiring only one cylinder and auxiliary elements to complete its cycle; however the engine should be of multicylinder variety as combustion is acquired only every other revolution of its crankshaft and it does not have compressed exhaust gas ignition. A piston 2 pivotally secured to connecting rod 24 rotatively engaging crankshaft 3 is reciprocative in relation to cylinder 1; a cylinder head 20 having admission passage 79 and admission valve 81, valve spring 90, rocker arm 91, rocker arm support 92, check valve 93, water passage 74 in communication with pump cylinder 71 and cooling water jacket 14a provide means for cooling compressed exhaust gas and expansive blowdown energy through exhaust ports 12 and turbine 76. A chain 89 driven half speed, relative to crankshaft, cam admission and detention valve shaft is provided; a pump cam 73 shaft 11 could just as well be incorporated in the said detention and admission valve shaft is illustrated as it is, simplyfing illustration. This embodiment includes the water reclamation system, the variable water injection system and the turbo blower system as previously described.

Referring to FIG. 7 is another embodiment of the present invention 10 indicates the cylinder block of an internal combustion engine; 11 represents a cooling water outlet collecting manifold, 21 is a variable control gear type force pump, 2 is an exhaust port manifold 75 a divergent nozzle, 28 an expansion bay, 76 exhaust turbine, 78 a turbine exhaust pipe to the water reclamation system described in the foregoing, 27 a force pump.

In operation embodiment illustrated in FIG. 1 switch 78 is closed and electric current heats glow plug 79, the engine is cranked by any of the conventional systems, cylinder 1 is charged with a combustible mixture provided by carburetion or solid injection, upon compression the mixture is ignited by the glow plug, the resultant gas expansion drives both pistons, to their furthest excursion; piston 7 having a 12 degree advance timing lead begins uncovering exhaust ports slightly in advance of piston 2, the resulting uniflo blow down of gas communicates its inertial mass momentum as a draughting influence to the fresh combustible mixture, further urged by blower 5 in entering cylinder 1 as piston 2 uncovers admission ports 13. Exhaust ports 12 and admission ports 13 are now closed capturing hot residual exhaust gas and combustible mixture in cylinders 6 and 1 respectively. A repetition of cycles continues until operating temperature has been acquired. Exhaust gas ignition is accomplished by a partial transfer of combustible mixture from the lesser compression zone of cylinder 1 through passage 19 to the greater compression zone of cylinder 6 where the said hot exhaust gas has become incandesant from low compression; propagation of combustion flame proceeds over comparatively narrow front in a controlled manner to main combustion charge where it completes its function. Upon moving lever 16 forward cam 72 is caused to act upon wedge 32 to move plunger 21 to force hot water from cylinder 71 flashed as steam tangentially into bay 28 mixing and producing powerful expansive energy with incandescent compressed gas and oposes further intrusion of combustion process into cylinder 6 and provides powerful blowdown energy through turbine 76 and greatly cools products of combustion or exhaust gas for condensation of the combustion compounded water vapor in condenser 56 for water filter treatment for recycling through entire system. Hot air from the air cooled condenser may be ducted to blower intake.

In operation embodiment illustrated in FIG. 3 switch 78 is closed electric current heats glow plug 79, the engine is cranked, stopper valve 82 is closed, combustible mixture is admitted through valve 81 into cylinder 1, piston 7 geared one half speed of crankshaft 3 is already closing its exhaust ports 12 and stopper valve 82 is opened; piston 2 begins its compression stroke with both pistons arriving at top center together, ignition of combustible mixture provides gas expansion driving piston 2 to its furtherest excursion while piston 7 has reached half way in its travel exhaust ports open upon 90 degree rotation of crankshaft 3, piston 2 returns on scavenge stroke forcing exhaust gas into cylinder 6 as piston 7 reaches its furthest downward excursion. A rotary detention valve 80 is in its 90° open position just as hot exhaust gas is about to enter exhaust ports 12, rotary detention 80 reaches closed position causing hot gas capture, stopper valve 82 closes, piston 2 moving downward admits a fresh charge of combustible mixture, stopper valve 82 opens, both pistons ascend compressing their respective charges, hot exhaust gas attains incandescense, a partial transfer of combustible mixture to larger volume cylinder 6 compression zone is ignited as it contacts said incandescent exhaust gas and propagation of combustion progresses into combustion zone of cylinder 1. A plunger 21 actuated by cam 73 flashes hot water to steam through divergent nozzle 75 into highly heated gas, thus providing powerful expansion oposing further intrusion of combustion process into cylinder 6 and a powerful blast of blowdown energy through the early opening of exhaust ports 12, energizes exhaust turbine 76 and communicates its elastic inertial momentum to the combustion gas in cylinder 1, thereby assisting scavenge stroke of piston 2 in transferring its exhaust to cylinder 6 for capture. The exhaust gas greatly cooled by steam expansion from turbine passes through condenser 56, the nitrogen and carbon dioxide is wasted to the atmosphere, the combustion compounded water vapor is condensed in condenser 56 and passes through water treatment and filtered of its impurities then recycled through the entire system.

In operation embodiment illustrated in FIG. 5 does not posess the exhaust gas ignition of the other modifications and requires either a conventional jump spark or other ignition system. Asuming a combustion stroke has just occurred, a loosley fitting rotary detention valve begins closing during the second 90° of rotation, of crankshaft 3 retaining most of combustion gas; piston 2 rising compresses combustion gas to high heat, hot water is drawn from cooling jacket 14a by plunger 21 and flashed as steam through divergent nozzle into compression zone absorbing heat from combustion gas powerfully blasting through ports 12 and open retention valve 80 energizing turbine and by its mass elastic momentum toward exhaust ports assists blower driven combustible mixture admission as valve 81 is opened by cam 91, pushrod 95 and rocker arm 91.

In operation embodiment illustrated in FIG. 7 only enough of the elements are illustrated to properly present the improvements thereto. The figure 10 representing an internal combustion engine and assuming it to be in operation, exhaust gas blasting from exhaust ports 12 is drawn through venturi 13; pressurized hot water admitted to variable controlled gear pump 21 is forced through diverging nozzle 75 by flashing steam compressed in bay 28 by the ejector action of said steam through said venturi. The steam and exhaust gas mingling under pressure powerfully exert their expansive energy through turbine 76, thus greatly cooling and facilitating condensation of the combustion compounded water vapor in a condenser 56 and water treatment filter 70 for recycling as makeup water through force pump 27 and the entire system; the said condenser and water treatment filter being the same as those as previously described.

while each of these embodiments differ from the other in appearance their functions are the same. Each one might serve more satisfactorily than another in certain applications. Various changes may be made in shape, size and number of cylinders used. For example, equivalent elements may be substituted for those illustrated and described herein, certain features of the invention may be utilized independently of the use of other features, all without departing from the spirit or scope of the invention as defined in the claims.

The advantages of this invention are many and some embodiments may be especially adapted for commercial use where semitrained operators are available; but the embodiment illustrated by FIG. 7 could be very generally used. Superior economy of operation, lower cost of construction, elimination for need of extraneous water supply, lower cost of construction cleaner exhaust emmissions, lighter weight, smaller condensing system required, suppressed noise in operation and less nuisance heat rejected are some of its desirable features.

What I claim is:

1. A power plant comprising:
   an internal combustion engine including at least a cylinder; a piston slidable in said cylinder and a piston rod operatively connected to said piston provide an expandable combustion chamber;
   means for injecting a combustible mixture into said combustion chamber whereby said engine is driven by the expanding products of a combustion process;
   a combined steam engine and compressor including at least a cylinder, a piston slidable in said cylinder and a piston rod operatively connected to said piston providing an expandable chamber;
   said combined steam engine and compressor being mounted adjacent to said combustion engine and having an open compression chamber in communication with the expandable chamber of said combustion engine;
   said combustion engine having its piston rod rotatively connected to a crankshaft in synchronous engagement with a crankshaft rotatively connected with the piston rod of the combined steam engine and compressor;
   means for leading hot products of said combustion process from the combustion cylinder to the combined steam engine and compressor;
   said synchronous crankshafts causing the concurrent compression of said hot products of combustion and said combustible mixture in the said combined steam engine and compressor and said combustion cylinder, respectively,
   said concurrent compression, bringing said hot products of combustion to incandescent heat providing ignition to communicating combustibles;
   means for, leading cooling water from a recirculation system around combustion cylinder and combined steam engine compressor cylinder head whereby said water is heated by said combustion process and superheated by said incandescantly compressed products of combustion;
   means for injecting said super heated water flashed as steam into said combined steam engine and compressor whereby expansion of said steam delivers both power to drive the steam engine phase of the combined steam engine and compressor and means for cooling said products of combustion;

said synchronous operation of said combustion engine and said combined steam engine and compressor providing a driving force of an expanding combustion process and expanding steam concurrently;

means for leading the exhaust steam and products of combustion from the combined steam engine and compressor to a recirculation system, whereby said cooling of said products of combustion facilitates condensing combustion compounded condensate;

said recirculation system constituting a means for condensing the said combustion compounded condensate and a means to separate the waste gases;

said condensate being circulated with said cooling water whereby the said condensate provides necessary makeup water.

* * * * *